Aug. 26, 1969   R. K. HAROLDSON   3,462,964
AIR CONDITIONER CONTROL MEANS RESPONSIVE
TO VEHICLE ENGINE POWER DEMANDS
Filed Sept. 12, 1967
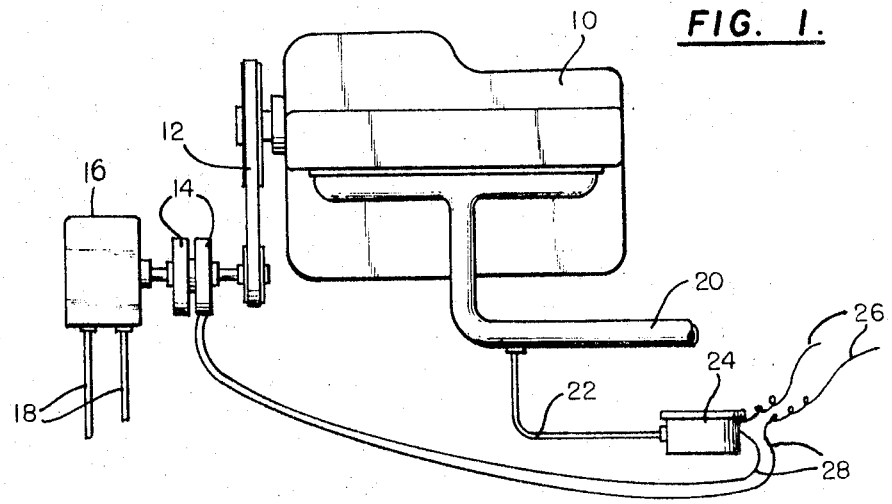
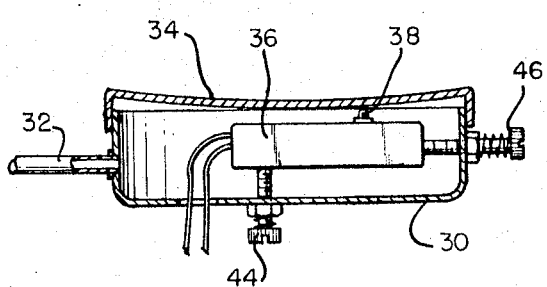
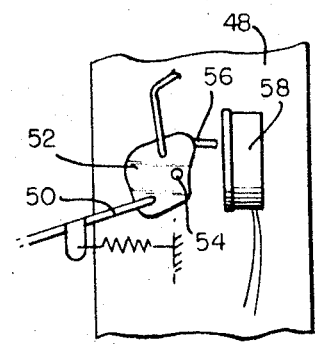
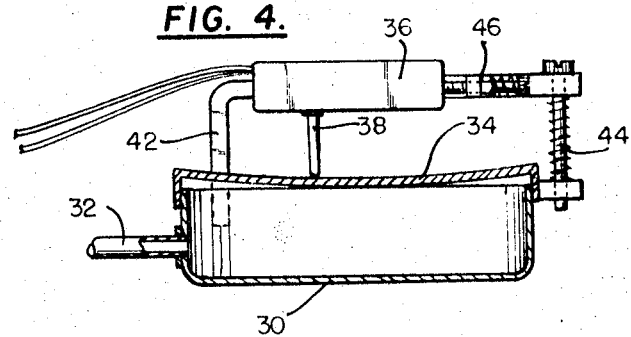
INVENTOR
Ralph K. Haroldson
BY Charles F. Steininger
ATTORNEY ns Patent Office 3,462,964
Patented Aug. 26, 1969

3,462,964
AIR CONDITIONER CONTROL MEANS RESPONSIVE TO VEHICLE ENGINE POWER DEMANDS
Ralph K. Haroldson, Dallas, Tex.
(5725 E. 63rd Place S., Tulsa, Okla. 74135)
Filed Sept. 12, 1967, Ser. No. 667,176
Int. Cl. B60h 3/04; H01h 35/34
U.S. Cl. 62—133    12 Claims

ABSTRACT OF THE DISCLOSURE

A system for automatically shutting off an automobile air conditioner if the full power of the automobile engine is needed including a vacuum line connecting the automobile intake manifold with a pressure-responsive switch having a flexible, concave cover, a normally open micro switch with its operating button adjacent the concave cover, and operable by inward movement of the concave cover, a set screw for adjusting the position of the micro switch relative to the concave cover in a horizontal direction and a set screw for adjusting the position of the micro switch relative to the concave cover in a vertical direction, a source of electrical power leading to the pressure-responsive switch, a source of electrical power passing from electrical switch to the operating clutch of an air-conditioning compressor and an operative connection between the clutch and the air conditioner compressor. In an alternate arrangement, an arm is connected to the accelerator and the arm is positioned to compress the concave cover of the switch when the accelerator is approaching the full power position.

Field of the invention

The present invention relates to an auto air conditioner switch. In a more specific aspect, the present invention relates to a simple electrical switch and a system for automatically operating an automobile air conditioner therewith.

The prior art

It is a well-known fact that automobile air conditioners require a substantial portion of the power of the automobile engine for their operation. This power requirement of the air conditioning system is particularly troublesome and dangerous when a high level of performance is necessary. For example, when one is attempting to pass another car, it is extremely important from a safety standpoint that the full power of the engine be available. While a number of complex systems have been provided for speeding up the engine under these circumstances, this does not provide an adequate answer since there is a point at which the engine cannot be speeded up and thus be made to handle both the air-conditioning system and the full power load of the automobile. Secondly, even though the engine might be speeded up to handle both the air conditioner and the full power load of the engine, the operation of a thermostatic switch on the air conditioner can result in sudden changes in the load. Further, while a wide variety of switches have been proposed for this and like use, all such switches appear to be unduly complex and expensive.

Summary of the invention

It is therefore an object of the present invention to provide an improved switch and automatic switching system for an automobile air conditioner which overcomes the problems and deficiencies pointed out above. It is another object of the present invention to provide an improved switch for an auto air-conditioning system. A further object of the present invention is to provide an improved system for shutting off an automobile air-conditioning system when full power of the engine is required for auto operation. Another and further object of the present invention is to provide an improved system for automatically shutting off an auto air conditioner when the engine is operated at a point approaching its full power capacity. Still another object of the present invention is to provide an improved system for automatically shutting off an auto air conditioner in response to an increase in the intake manifold pressure of the engine above a preselected point. Another and further object of the present invention is to provide an improved switch wherein a flexible concave surface forms one exterior wall of the switch. Another and further object of the present invention is to provide an improved switch wherein a flexible, concave element forms one exterior wall of the switch and flexing of this element depresses the plunger of a double-throw, snap-action electrical switch.

Briefly, the present invention involves a system for turning off an auto air conditioner when full power is required for operation of the auto, including means for sensing a predetermined condition of the automobile engine as maximum engine power is approached and switch means responsive to the sensed condition to interrupt the electrical circuit to the air conditioner when said predetermined condition is sensed.

Brief description of the drawings

In accordance with the drawings, FIGURE 1 shows the system of the present invention in schematic form;
FIGURE 2 shows the operation of the switch of the present invention by different actuating means than FIGURE 1;
FIGURE 3 shows one form of the switch of the present invention; and
FIGURE 4 shows another form of the switch of the present invention.

Description of the preferred embodiments

Referring now to the drawings, FIGURE 1 shows an automobile engine 10 having a belt or other appropriate transmitting means operatively connecting the engine to one element of the clutch 14. The other element of the clutch 14 is, in turn, coupled to an air-conditioning compressor 16. Compressor 16, of course, has refrigerant passing to and from the unit through refrigerant lines 18. The continuously rotating element of clutch 14 is electrically actuated by power transmitted from a power source through lines 26 and lines 28. Forming a part of the engine 10 is intake manifold 20. In open communication with intake manifold 20 is section line or vacuum line 22. The other end of vacuum line 22 is connected to pressure-responsive switch means 24. The pressure-responsive switch means 24 is mounted in lines 26 and 28 in a manner such that the switch will make and break the circuit between the source of power and the air conditioner clutch 14.

In the operation of this form of the present invention, the pressure-responsive element of pressure-responsive switch means 24 senses the intake manifold pressure of the engine. When the throttle is opened up to a point near its full capacity, the manifold pressure approaches atmospheric pressure. The pressure-responsive element senses this condition and responds to a preselected pressure. By this response, it actuates the switch element of the pressure-responsive switch means, turns the switch off and thereby interrupts the power to the air conditioner clutch 14. Although the manifold pressure remains at this relatively high pressure (near atmospheric) for only a small fraction of the time, this fraction of time occurs when full power of the engine is needed most, such as when attempting to pass another car, etc. When the manifold pressure again drops, this is sensed by the pressure-responsive element of the switch means and this element responds to the lowered pressure to actuate the electrical switch and again close the circuit between the power source and the air conditioner compressor.

FIGURE 2 of the drawings shows an alternate means of operating the switch. However, before discussing the details of FIGURE 2, it is believed best to discuss the construction of the switch of the present invention which actually can be pressure-responsive or operated by an appropriate arm mechanism.

Specifically referring to FIGURES 3 and 4, the switch of the present invention is made up of a base element in the general shape of a circular can bottom 30, a vacuum line 32 in open communication with base 30 and designated as vacuum line 32 leads to the engine manifold where the manifold pressure is the condition sensed. The switch has a generally concave cover 34 which fits tightly over the base 30 to form an airtight container. It is obvious at this point that the cover 34 may be concave or convex and that the concavity or convexity may be in the base rather than in the cover depending on how the unit is to be mounted. Further, where mechanical operation of the switch is desired, the vacuum line 32 may be eliminated. Mounted within the enclosure is a micro switch 36 having a plunger 38. In the instance shown in FIGURE 3, micro switch 36 is a normally open switch and when the cover 34 is depressed either mechanically or by drawing a vacuum through line 32, the plunger 38 will be depressed, closing the circuit in which switch 36 is mounted. Switch 36 is mounted on a bracket in a manner such that it may slide to the right and left a limited amount. This bracket (not shown) is positioned behind switch 36 to permit movement of switch 36 in a vertical direction. In the variations shown in FIGURE 4, the switch can only be pressure actuated since switch 36 is mounted on a flexible arm 42 above the cover 34 of the container. Of course, by moving the switch slightly to the side of the center, mechanical operation for flexing of the cover 34 may be carried out. In any event, in this instance, switch 36 is a normally closed switch which is open when cover 34 is in its normal state of flexure and which will be closed when the plunger 38 is released by the downward flexure of cover 34. Switch 36 in FIGURE 4 is also mounted on arm 42 in a manner to permit vertical and horizontal movement thereof. In both FIGURES 3 and 4, vertical movement of switch 36 and hence a change in the set point of the switch is effected by means of set screw 44. Horizontal movement of switch 36 and hence a change in the differential pressure response of the switch is effected by adjustment of the screw 46.

In the alternative form of FIGURE 2 which does not require a sensing of the manifold pressure, operation can be effected mechanically by depressing the accelerator of the automobile to a point near its ultimate limit. As shown in FIGURE 2, the accelerator control rod 50 is connected to pivotal tab 52. Pivotal tab 52 is mounted on pivot 54 on the side of the carburetor of the engine 48. An operating pin or rod 56 bears against the top of switch 58. Switch 58 is positioned and set to operate and open the switch when the accelerator nears its ultimate travel, rod 50 nears its extreme pull to the left, and tab 52 approaches its maximum clock-wise rotation. Thus, in accordance with FIGURE 2, when the accelerator is depressed to a point near its maximum limit, in order to pass another car, etc., the pin 56 operates the switch means 58, the switch is opened and the air conditioner is turned off. When the accelerator is released, the switch again closes and the air conditioner may operate normally in response to the thermostatic switch.

While the present invention has been described with reference to specific illustrations and specific examples, it is to be understood that these are illustrative only.

I claim:

1. A system for automatically shutting off an auto accessory adapted to be driven by the engine of said auto when the operation of said engine approaches its maximum capacity, as indicated by a preselected high pressure in the intake manifold of said engine, comprising; sensing means, operatively connected to said intake manifold of said engine, for sensing said preselected high pressure; and switch means operatively coupled to said sensing means and operable by said sensing means, in a manner such that said switch means is opened when said sensing means senses said predetermined high pressure, and operatively connecting said engine to said accessory whereby said accessory is operative or non-operative as dictated by said switch.

2. A system in accordance with claim 1 wherein the preselected manifold pressure is a pressure approaching atmospheric pressure.

3. A system in accordance with claim 1 wherein the sensing means is a closed, generally-hollow container having a flexible wall which is flexed by a change in pressure in the container, the switch means is mounted adjacent said flexible wall and the operating element of said switch means is operated by flexure of said flexible wall.

4. A system in accordance with claim 3 wherein the switch means is adjustably mounted on the container to permit movement of the operating element of said switch means laterally with respect to the center of flexure of the flexible wall of said container.

5. A system in accordance with claim 3 wherein the switch means is adjustably mounted on the container to permit movement of the operating element of said switch means toward and away from the flexible wall of said container.

6. A system in accordance with claim 3 wherein the switch means is adjustably mounted on the container to permit movement of the operating element of said switch means laterally with respect to the center of flexure of the wall of said container and to permit movement of said operating element of said switch means toward and away from said flexible wall of said container.

7. A system for automatically shutting off an auto air-conditioner adapted to be driven by the engine of said auto when the operation of said engine approaches its maximum capacity, as indicated by a preselected high pressure in the intake manifold of said engine, comprising; sensing means, operatively connected to said intake manifold of said engine, for sensing said preselected high pressure; and switch means operatively coupled to said sensing means and operable by said sensing means, in a manner such that said switch means is opened when said sensing means senses said predetermined high pressure, and operatively connecting said engine to said air-conditioner whereby said air-conditioner is operative or non-operative as dictated by said switch.

8. A system in accordance with claim 7 wherein the preselected manifold pressure is a pressure approaching atmospheric pressure.

9. A system in accordance with claim 7 wherein the sensing means is a closed, generally-hollow container having a flexible wall which is flexed by a change in pressure in the container and the switch means is mounted adjacent said flexible wall and the operating element of said switch means is operated by flexure of said flexible wall.

10. A system in accordance with claim 9 wherein the switch means is adjustably mounted on the container to permit movement of the operating element of said switch means laterally with respect to the center of flexure of the flexible wall of said container.

11. A system in accordance with claim 9 wherein the switch means is adjustably mounted on the container to permit movement of the operating element of said switch means toward and away from the flexible wall of said container.

12. A system in accordance with claim 9 wherein the switch means is adjustably mounted on the container to permit movement of the operating element of said switch means laterally with respect to the center of flexure of the flexible wall of said container and to permit movement of said operating element of said switch means toward and away from said flexible wall of said container.

References Cited

UNITED STATES PATENTS

| | | | |
|---|---|---|---|
| 2,107,341 | 2/1938 | Peo | 62—133 X |
| 2,268,667 | 1/1942 | Mendez | 62—133 |
| 2,929,226 | 3/1960 | Baker et al. | 62—215 |
| 3,121,314 | 2/1964 | Koyanagi | 62—133 |

A. HARRY LEVY, Primary Examiner

U.S. Cl. X.R.

62—323; 180—1, 77, 53; 200—61.89, 83